United States Patent [19]

Nilsson

[11] 4,147,259

[45] Apr. 3, 1979

[54] FEED MECHANISM FOR LOG SAWING MACHINE

[75] Inventor: Uno B. Nilsson, Bruzaholm, Sweden

[73] Assignee: Bruzaholms Maskiner AB, Hjaltevad, Sweden

[21] Appl. No.: 856,129

[22] Filed: Dec. 1, 1977

[51] Int. Cl.² .............................................. B65G 47/90

[52] U.S. Cl. ...................................... 414/745; 144/39; 144/242 R; 144/312; 198/486; 83/435.1; 414/753

[58] Field of Search .................. 214/1 BB, 1 BT, 1 P, 214/6 BA; 198/486; 144/1 R, 3 R, 39, 242 R, 312; 83/435.1, 474

[56] References Cited

U.S. PATENT DOCUMENTS

| | | | |
|---|---|---|---|
| 2,701,065 | 2/1955 | Bertel | 214/6 BA |
| 3,179,262 | 4/1965 | Carlson, Sr. et al. | 214/1 BT |
| 4,082,193 | 4/1978 | Teague | 214/1 P |

*Primary Examiner*—Albert J. Makay

*Assistant Examiner*—Ross Weaver

*Attorney, Agent, or Firm*—Ira Milton Jones & Associates

[57] ABSTRACT

For feeding logs to a sawing machine, two parallel horizontal I-beams, at a level above the sawing machine, guidingly support an inner and an outer feed carriage. From each carriage pincers-like log supporting jaws extend obliquely downwardly and in the feed direction. The I-beams provide an inner track that has its rails between the rails of an outer track. The inner carriage is wholly between the rails of the inner track and rides thereon. The outer carriage bridges over both tracks and rides on the outer one, and its jaw operating mechanism has portions above the level of the inner track and other portions extending down from said level that are laterally outside the outer track. The carriages can therefore pass one another and exchange leading/trailing relationship for each successive log. Mechanism is disclosed for causing carriage jaws to close on a positioned log without shifting it but by which the closed jaws can be laterally shifted as desired.

6 Claims, 5 Drawing Figures

FEED MECHANISM FOR LOG SAWING MACHINE

This invention relates to apparatus whereby successive elongated workpieces are fed through a sawing or trimming machine with a translatory substantially lengthwise motion; and the invention is more particularly concerned with feed apparatus for a sawing machine or the like, comprising a pair of carriages that are each equipped with means for supportingly gripping a log or similar irregularly shaped workpiece and which cooperate to constrain the workpiece to translatory motion along a defined feed path.

Where irregularly shaped workpieces are to be converted into boards, cants or the like that have straight and parallel surfaces, a distinctive orientation must often be established for each workpiece before it is fed through a cutting machine by which the workpiece is reduced to finished or semi-finished articles. That orientation, determined on the basis of estimate or calculation, takes account of the geometry of the particular workpiece and is intended to enable the workpiece to be converted to a finished article, or to finished articles, that are of optimum size or value. Once established, that orientation must be maintained until the workpiece has passed through the sawing or trimming machine, which is to say that after orientation the workpiece must be moved with a strictly translatory motion.

When an elongated workpiece such as a log has no flat surface upon which it can rest, it can be confined against rotation and other undesired motions by gripping it with two sets of jaw-like gripping elements, one set near each end of the log and each set engaging diametrically opposite side portions of the log. In apparatus for feeding logs to a sawing machine, it has heretofore been conventional to mount each set of gripping elements on an individual carriage that was constrained to back and forth motion along a feed path, toward and from the sawing machine. By using two such carriages it was possible to adjust the distance between the gripping elements on the respective carriages to accommodate logs of different lengths, thus enabling every log to be gripped at locations as close as possible to its opposite ends so that during feeding motion it would be supported with the utmost stability. As the log was fed into the sawing machine, the two carriages were constrained for a time to move towards the sawing machine in the same direction and at the same speed. They continued in such unison motion until the leading carriage was at a forward limit of its travel, very close to the sawing machine, whereupon the gripping elements on the leading carriage released their hold on the log, and that carriage stopped its travel in the feed direction. At that time a portion of the log had already been operated upon by the sawing machine; and thereafter the front end portion of the log was supported and steadied by its engagement with the sawing machine. Meanwhile, the gripping elements on the trailing carriage remained in engagement with the log to support its rear end portion, and the trailing carriage continued to move in the feed direction until its further forward movement was blocked by the leading carriage. When the trailing carriage reached this limit of its feeding movement, its gripping elements were disengaged from the log, which was thereafter pulled or driven through the sawing machine by other means, and both carriages were then moved back to their starting positions to be loaded with another log.

During the return movement of the carriages no log was being fed through the sawing machine or loaded onto the carriages, and therefore the time required for the return movement was lost from production. Since rearward return movement of the carriages usually took place at the same speed as forward feeding movement, the carriages were accomplishing useful production during only half of the time that they were in motion.

In the light of the present invention it can now be appreciated that the potential usefulness of the leading carriage was lost through a substantial part of each feeding cycle, as the leading carriage, after disengagement of its gripping element from a log, paused at the forward limit of its feeding stroke and waited idly for the trailing carriage to finish its feeding stroke and begin its return stroke.

Another objection to prior log feeding mechanisms of the character described was that the lateral position of the log could not be changed once it had been engaged by the gripping elements on the respective carriages, so that if it became apparent that the log had not been properly oriented in the first place, or that a more advantageous orientation was possible, no reorientation or lateral adjustment of the log could be effected.

With the above stated considerations in mind, it is a general object of the present invention to provide a feed mechanism of the character described that enables logs or similar workpieces to be fed in rapid succession through a sawing machine or the like, without any necessity for delay between successive workpieces to allow a carriage of the feed mechanism to accomplish a return movement, and whereby the carriages of the feed mechanism are ready to carry a new log through the feed mechanism just as soon as a preceding log has been moved far enough in the feeding direction to make room for the new one.

It is also an object of the invention to provide a highly efficient feed mechanism of the character described that comprises a pair of carriages, each of which is constrained to move in opposite feeding and return directions and is equipped with a set of jaw-like gripping elements that can be engaged with opposite sides of a log or the like that is to be supported and translatingly advanced by the carriage, said gripping elements being so arranged that they can grip and support a log without displacing it from a previously established position and orientation and can also be adjusted for controlled lateral shifting of the log so that its orientation can be changed while it is being carried by the feeding mechanism.

Another and more specific object of the invention is to provide a feeding mechanism for feeding logs or the like through a sawing or trimming machine, comprising a pair of carriages that cooperate in supporting a log for feeding motion and move in unison in the feeding direction, but which carriages are arranged to pass each other while moving in opposite relative directions, so that a leading carriage which reaches the end of its forward feeding stroke can immediately begin a return movement in the opposite direction, back to a starting position, passing the trailing carriage in the course of such return movement while the trailing carriage continues its motion in the feeding direction.

With these observations and objectives in mind, the manner in which the invention achieves its purpose will be appreciated from the following description and the accompanying drawings, which exemplify the invention, it being understood that changes may be made in the specific apparatus disclosed herein without departing from the essentials of the invention set forth in the appended claims.

The accompanying drawings illustrate one complete example of an embodiment of the invention constructed according to the best mode so far devised for the practical application of the principles thereof, and in which.

Figure 1:
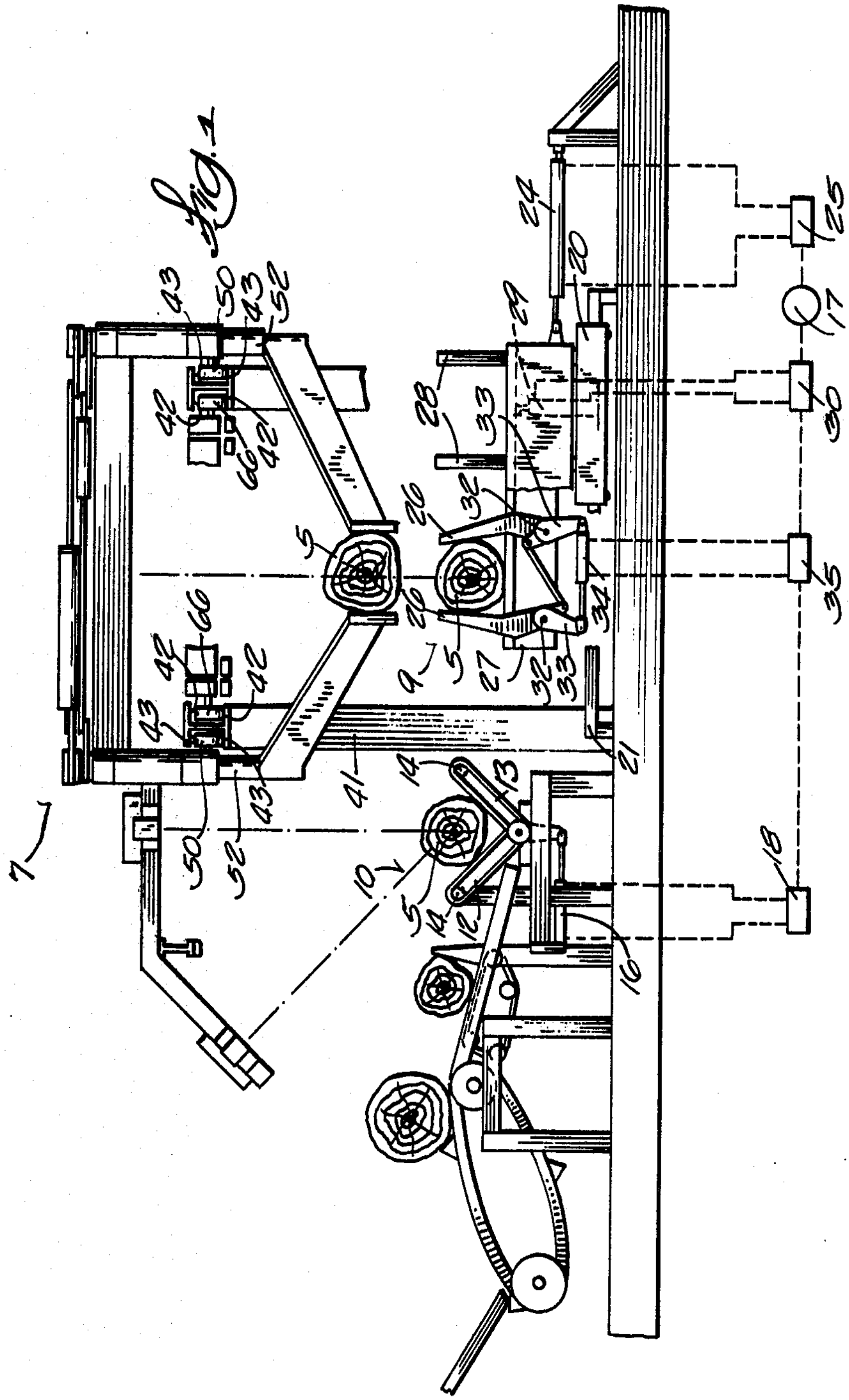
FIG. 1 is an end view of a log feeding mechanism embodying the principles of this invention, shown in its relationship to log orienting apparatus with which the log feeding mechanism is adapted to cooperate.

Referring now more particularly to the accompanying drawings, a log 5 that is to be processed by means of the apparatus of this invention is ultimately fed through a sawing or trimming machine 6 by means of a feed machanism 7 that moves the log through the machine 6 with a translatory substantially lengthwise motion. But before the log is delivered to the feed mechanism 7 it must first be measured or appraised for the purpose of determining the orientation that it should have in the feed mechanism in order for an optimum yield to be obtained from it; and such measurement or appraisal takes place at a measuring station 8 that is spaced a distance to one side of the feed mechanism. The log is transferred from the measuring station to the feed mechanism by means of a transfer mechanism 9. The log undergoes a partial orientation at the measuring station and undergoes a further orientation in the course of being transferred to the feed mechanism, so that the measuring station and the transfer mechanism can, together, be regarded as orienting apparatus.

As delivered to the measuring station 8, the log 5 has more or less the orientation that it is intended to have in the feed mechanism 7, in that its length is approximately parallel to the feed path along which it will be carried by the feed mechanism.

At the measuring station a first correction is made in the orientation of the log in that the log is rotated to a rotational position deemed most favorable for cutting. Thereafter the log is maintained in that rotational position until cutting is finished. In the course of its transfer from the measuring station 8 to the feed mechanism 7 by means of the transfer mechanism 9, heighwise and lateral adjustments are made in the orientation of the log, and thus it is established in the feed mechanism in exactly a desired position and orientation for cutting.

The measuring station 8 is defined by a row of supporting elements 10, each of which comprises a pair of chain arms 11, 12. As shown, there are four supporting elements 10 at the measuring station, but each log need only be supported by two of the supporting elements, namely the two that are inwardly adjacent to the ends of the log; and the other two supporting elements can remain in inoperative positions, out of contact with the log. In the operative position of a supporting element its two chain arms 11, 12 cooperates to define a V in which a log is cradled and substantially confined to rotation.

Each of the chain arms 11, 12 comprises an endless chain 13 trained over freely rotatable sprockets 14 at the opposite ends of the chain arm, with one straight stretch of the chain arranged to be engaged by the log to facilitate its rotation. Such rotation can be effected manually, by means of a rotatable device 15 (see FIG. 4) that comprises a pair of jaws engageable with opposite sides of a log near one end of it.

The chain arms 11, 12 of the supporting elements can be swung between operative and inoperative positions by means of double-acting cylinder actuators 16, one for each supporting element. In their inoperative positions the two chain arms 11, 12 of a supporting element extend horizontally in opposite directions from their common swinging axis. Each cylinder actuator 16 is connected with a pump 17 through a suitable control valve 18 which is here illustrated as manually controlled but which could obviously be controlled automatically in any suitable manner. The preferred pressure fluid is oil, although other pressure media could be used. The motion transmitting connections between each cylinder actuator 16 and its chain arms 11, 12 are not illustrated in detail because suitable connections are well known.

Figure 2:
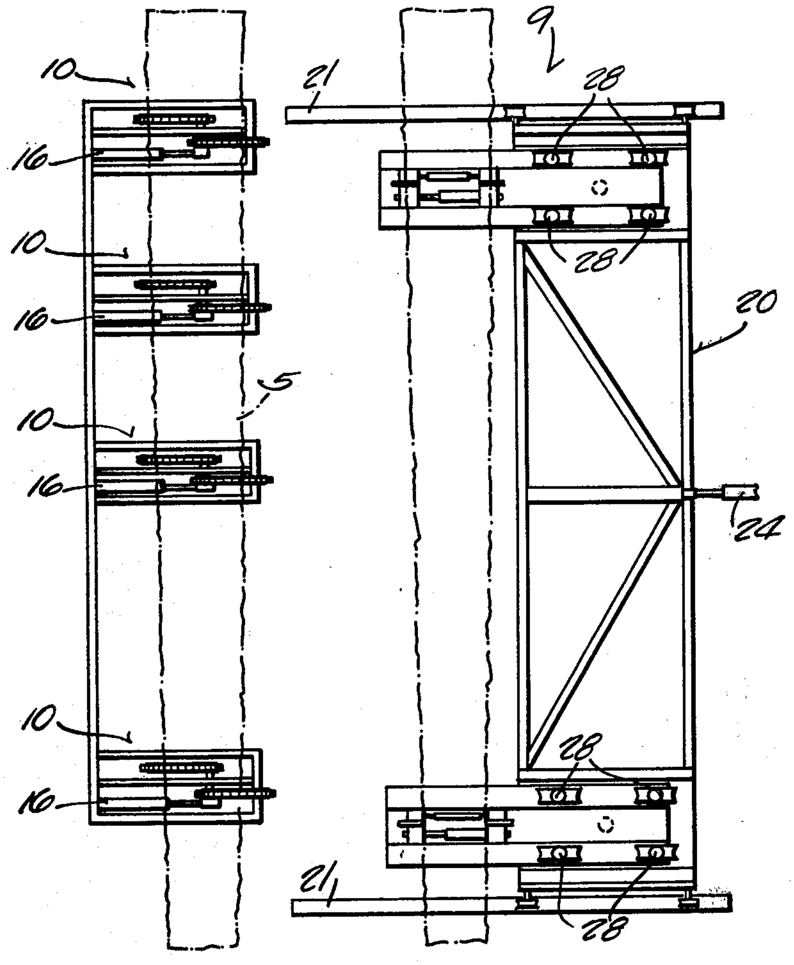
FIG. 2 is a top view of the log orienting apparatus with certain portions omitted for the sake of simplicity.

The transfer mechanism 9 by which a log is moved from the measuring station to the feed mechanism comprises a carriage 20 which is elongated in the feed direction (as best seen in FIG. 2) and which is guided for horizontal motion transverse to its length by means of fixed parallel rails 21. Upper and lower rollers 22 and 23 on the carriage 20 engage the top and bottom surfaces of the rails 21 to confine the carriage to translatory motion along the rails. Such motion can be imparted to the carriage by means of a double-acting cylinder motor 24 that reacts between the carriage 20 and a stationary part of the machine frame. The pressure fluid source for the motor 24 can be the pump 17, connected with that motor through a control valve 25.

The log to be transferred is secured to the carriage 20 by means of sets of gripper jaws 26, so located along the length of the carriage 20 that each set of gripper jaws can pass between two supporting elements 10 of the measuring station. Thus, there are four sets of gripper jaws 26 on the carriage 20, but for simplicity only two of those sets are shown in FIG. 2. To permit the gripper jaw sets 26 to be individually raised and lowered relative to the carriage, each set of gripper jaws is mounted on an elevator frame 27. Each elevator frame 27 is constrained to move with the carriage and is guided for up and down motion relative to the carriage by means of four upright guide posts 28 that are fixed to the carriage and are engaged by suitable guide rollers on the elevator frame. Each elevator frame 27 is raised and lowered by means of its own cylinder motor 29, which reacts between the elevator frame and the carriage and which can be connected with the pump 17 through a control valve 30. (It will be understood that the pressure fluid circuitry is illustrated in simplified form in that, for example, only one control valve 30 for the elevator motors 29 is shown, whereas in fact there is preferably a control valve for each elevator motor.)

Each of the gripper jaws 26 comprises a lever-like jaw member that is pivoted to the elevator frame, the two jaws of each set being swingable about parallel horizontal axes defined by shafts 32. Each jaw member is rigidly secured to its shaft 32, and there is also rigidly secured to its shaft a lever arm 33 that projects away from the jaw member. Connected between the free ends of the lever arms 33 is a double-acting cylinder motor 34 which diverges the jaw members 31 when it contracts and converges them when it extends. The cylinder motor 34 is controlled by a valve 35 that can be connected in circuit with the pump 17. To coordinate the swinging movements of the two jaw members 31 of each pair, a suitable linkage 37 is connected between their shafts 32.

When the cylinder motor 34 is fully contracted, the two jaw members 26 are disposed in nearly horizontal attitudes, so that they can pass under a log that is supported in the operative supporting elements 10 at the measuring station. Furthermore, when the carriage 20 is moved to the measuring station by extension of the cylinder motor 24, each of the elevators 27 is in its lowermost position, to ensure that the open jaws will be spaced beneath the log as they pass under it. Each elevator can then be raised, by means of its cylinder motor 29, until it just engages the underside of the log, and thereupon each set of gripper jaws 26 can be swung shut, to engage against opposite sides of the log, by extension of the cylinder motor 34. Once the log is thus securely held by the transfer mechanism, the chain arms 11 at the measuring station can be swung down to their horizontal positions, to be clear of the log as it is carried out of the measuring station and towards the feed mechanism 7 upon contraction of the cylinder motor 24 for the carriage 20. As the log is carried towards the feed mechanism, a new log can be delivered to the measuring station.

The feed mechanism 7 to which the log is delivered by the transfer mechanism 9 comprises an inner feed carriage 38 and an outer feed carriage 39, both of which move along tracks provided by a pair of rather larger, parallel I-beams 40 that are supported on suitable uprights 41 at an elevation some distance above the top of the sawing machine 6. These I-beams extend horizontally in the feed direction and have their front end portions over the sawing machine 6. Each I-beam has inner flanges 42 that project laterally towards the other I-beam, and these inner flanges of the two I-beams cooperate to provide an inner track upon which the inner feed carriage 38 is supported and guided. The opposite or outer flanges 43 on the I-beams, which project away from one another, define an outer track upon which the outer feed carriage 39 is supported and guided. As the description proceeds, it will be seen that the inner and outer tracks could as well be defined by separate sets of rails, always provided that the rails of the inner track are disposed between the rails of the outer track, and that the rails of each track are parallel to one another and to the rails of the other track.

The inner feed carriage 38 lies wholly between the rails of the inner track. The outer feed carriage 39, however, is formed to straddle or bridge across both sets of tracks and to engage the rails of the outer track at their outer or remote sides. It will be apparent, therefore, that the carriages 38 and 39 can pass each other freely as they move in either direction along the tracks.

Each of the feed carriages is equipped with a pair of pincers-like gripping jaws, the jaws on the inner carriage 38 being designated 44 and those on the outer carriage 39 being designated 45. These pincers-like jaw elements on each carriage project obliquely downwardly and forwardly from the carriage, so that they can cooperate to support a log at an elevation suitable for its feed to the sawing machine. In each case the jaw elements 44, 45 on a carriage 38, 39 are swingable toward and from one another about a vertical axis. As the description proceeds, it will be apparent that the structure which supports and controls the jaw elements 44 on the inner carriage 38 is located wholly between the inner rails, whereas the structure that supports and controls the jaw elements 45 on the outer carriage 39 is located above the inner tracks and laterally outside the outer tracks; and this arrangement, too, is for the purpose of enabling the carriages 38 and 39 to pass one another.

Figure 3:
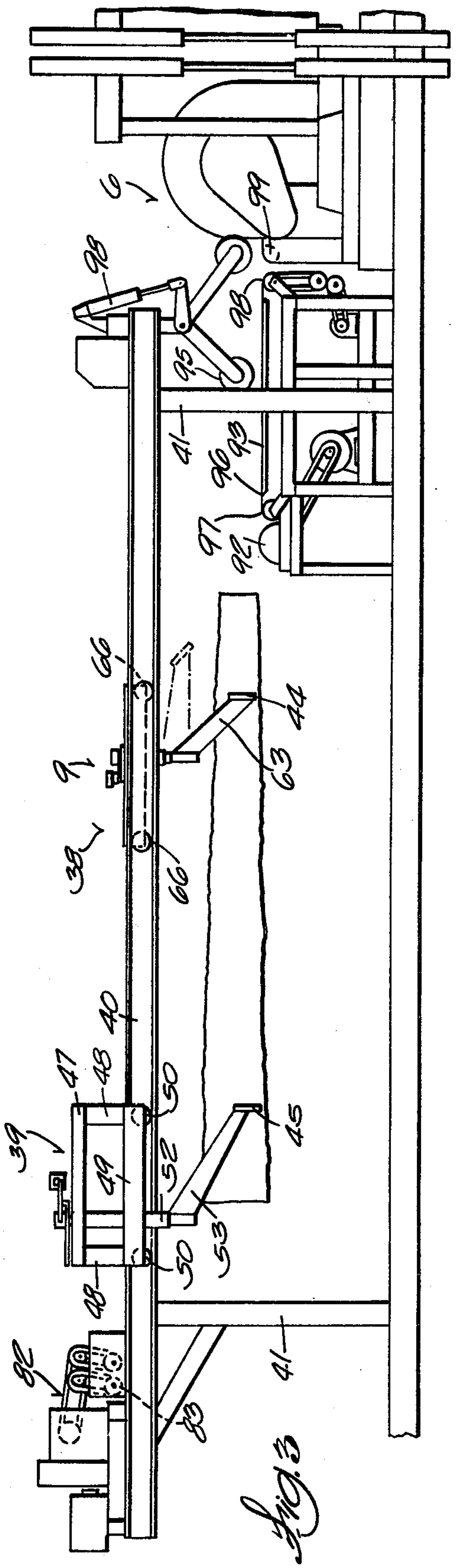
FIG. 3 is a view in side elevation of the feed mechanism, shown in its relationship to a sawing machine with which it cooperates.
Figure 5:
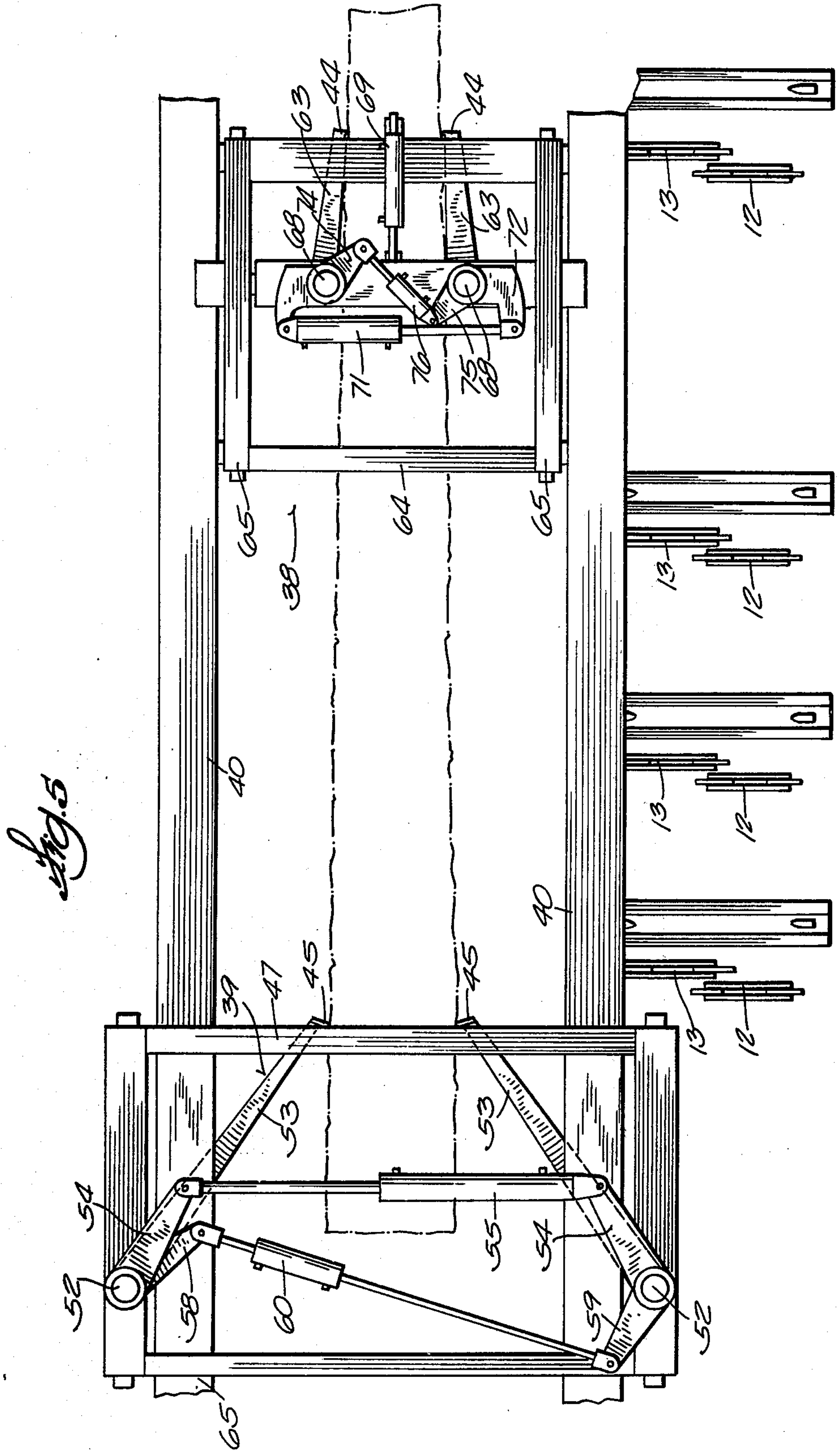
FIG. 5 is a view generally similar to FIG. 4, but on a larger scale and showing only a portion of the feed mechanism.

It will now be apparent that with the feed carriages 38 and 39 occupying starting positions along the tracks, such as their positions shown in FIG. 3, the carriage 20 of the transfer mechanism can be brought to a position in which a log thereon is more or less centered between the I-beams 40 that provide the feed mechanism tracks, so that the log can be gripped by the jaw elements 44 and 45 on the respective feed carriages 38 and 39. But before the log can be transferred to the feed mechanism, the elevators 27 on the transfer mechanism carriage must be raised, by extension of their respective cylinder motors 29, to bring the log to the elevation and vertical orientation that is desired for its feed through the sawing machine 6. Such vertical positioning and orientation of the log can be accomplished either during the time that the transfer mechanism carriage 20 is moving towards the feed mechanism or after it reaches its terminal position, shown in FIG. 1, in which a log on it is centered between the I-beams 40.

With the transfer mechanism carriage 20 in its terminal position and the log thereon established in the desired vertical position and orientation, the pincers-like jaw elements 44, 45 on the two feed carriages 38, 39 can be converged into secure gripping engagement with the log, so that the log is then supported by the feed mechanism. Thereupon the gripper jaws 26 of the transfer mechanism can be swung apart and downwardly, by contraction of their cylinder motors 34, the elevators 27 can be lowered, and the carriage 20 of the transfer mechanism can be returned to the measuring station 8 for another log.

Attention is now directed to details of the construction of the two carriages 38, 39 of the feed mechanism.

The outer carriage 39 comprises a rectangular horizontal frame 47 that is wide enough to span the I-beams 40 and is supported at an elevation well above the I-beams on legs 48 that project down from its four corners. The two legs 48 at each side of the carriage have their lower ends connected by a short beam 49 that lies laterally outwardly of the outer I-beam flanges 43 and on which are mounted freely rotatable rollers 50 that engage the flanges 43 to supportingly guide the carriage. At each side of the carriage the frame 47 and the beam 49 conjointly support and journal an upright shaft 52 that is confined to rotation. Note that each of the shafts 52 is located laterally outwardly of the outer flanges 43 of its adjacent I-beam, and that the lower end portion of each shaft is at a level below the I-beams. To the lower end of each of the shafts 52 is anchored one of the arms 53 that comprise the pincers-like gripping element 45 on the carriage 39. By simutaneous rotation of the shafts 52 in opposite directions, the two arms 53 can be swung towards or away from one another. Such rotation is imparted to the shafts 52 by means of a lever arm 54 fixed to the upper end of each of the shafts 52 and a double-acting cylinder motor 55 that is connected between the free outer ends of those two lever arms.

The lever arm 54 on each shaft 52 projects laterally from that shaft in the same direction as its associated jaw arm 53, and therefore contraction of the cylinder motor 55 converges the jaws and its expansion diverges them. Through a control valve 56 that can be either manually or automatically operated, the jaw actuating cylinder motor is communicable with a pump 57 that provides a source of pressure fluid which is, again, preferably pressurized oil.

For shifting the lateral position of the converged jaw elements 45 each of the shafts 52 has a further laterally projecting lever arm 58, 59 secured to its upper end, the lever arm 58 on one shaft being oriented more or less forwardly while the lever arm 59 on the other shaft is oriented more or less rearwardly. Connected between the outer ends of these lever arms 58 and 59, and serving as an adjustable link between them, is another double-acting cylinder motor 60. The cylinder motor 60 is communicable with the pump 57 through a control valve 61 which can be operated manually or automatically. The control valve 61 has a "float" condition in which the motor 60 is cut off from the pump 57 and can freely extend or contract in response to forces exerted upon it by the lever arms 58 and 59; the valve 61 also provides for a "locked" condition of the motor 60 in which fluid is prevented from flowing to and from it. The valve 61, in addition, has two other conditions, in which it communicates the motor 60 with the pump 57, in one of which the motor is caused to extend and in the other of which it is caused to contract.

When the jaws 45 are converged to grip a log that is being supported by the transfer mechanism 9, the cylinder motor 60 can be allowed to float, so that the jaw arms 53 can swing as necessary to adapt themselves to the position of the log. Once engaged with the log and confined in engagement with it by the converging force exerted upon them by the cylinder motor 55, the distance between the free ends of the arms 53 is fixed, and it will be apparent that contraction of the cylinder motor 60 causes the free ends of the arms (together with the portion of the log that is between them) to be shifted in one lateral direction (downward in FIG. 4), whereas extension of that motor effects an opposite lateral shift of the arms 53 and the log between them. When the jaws 45 have thus been established in a desired lateral position, the motor 60 can be put in its "locked" condition to hold the jaws against lateral shifting.

The cylinder motors 55 and 60 on the outer feed carriage 39, and the lever arms with which they respectively connect, are all located at a level substantially above the I-beams 40, so that no interference is presented to the inner feed carriage 38 when the carriages 38 and 39 pass one another.

The gripping elements 44 on the inner feed carriage 38 are actuated and positioned by mechanism which is in most respects similar to the above-described mechanism on the outer carriage 39, but, in addition, the lever arms 63 that comprise those gripping elements are capable of being swung upwardly, to an inoperative position shown in broken lines in FIG. 3 and in which they are at a level just below the bottom surfaces of the I-beams 40. When they are in this inoperative position, they can readily pass between the upper portions of the jaw arms 53 of the outer feed carriage 39.

The inner carriage 38 comprises a horizontal rectangular frame 64 having lengthwise extending side members 65 on which there are rollers 66 that engage the inner flanges 42 of the I-beams, to movably support the frame. The side members also provide bearings for a cross-beam 67 that extends between them and is rotatable about a horizontal axis which extends lengthwise in it and which is thus transverse to the feed direction. Shafts 68 that correspond generally to the shafts 52 on the outer carriage are journaled in the rotatable cross-beam 67 and have the jaw arms 63 secured to their lower ends, so that rotation of the cross-beam 67 about its axis raises those jaw arms to their inoperative position or lowers them to the operative position shown in full lines in FIG. 3. Such swinging motion is imparted to the rotatable cross-beam 67 by means of a doubleacting cylinder motor 69 which has one of its ends connected to one of the end members of the frame 64 and its other end eccentrically connected to the rotatable cross-beam. The cylinder motor 69 can be communicated with the pump 57 through a control valve 70.

Figure 4:
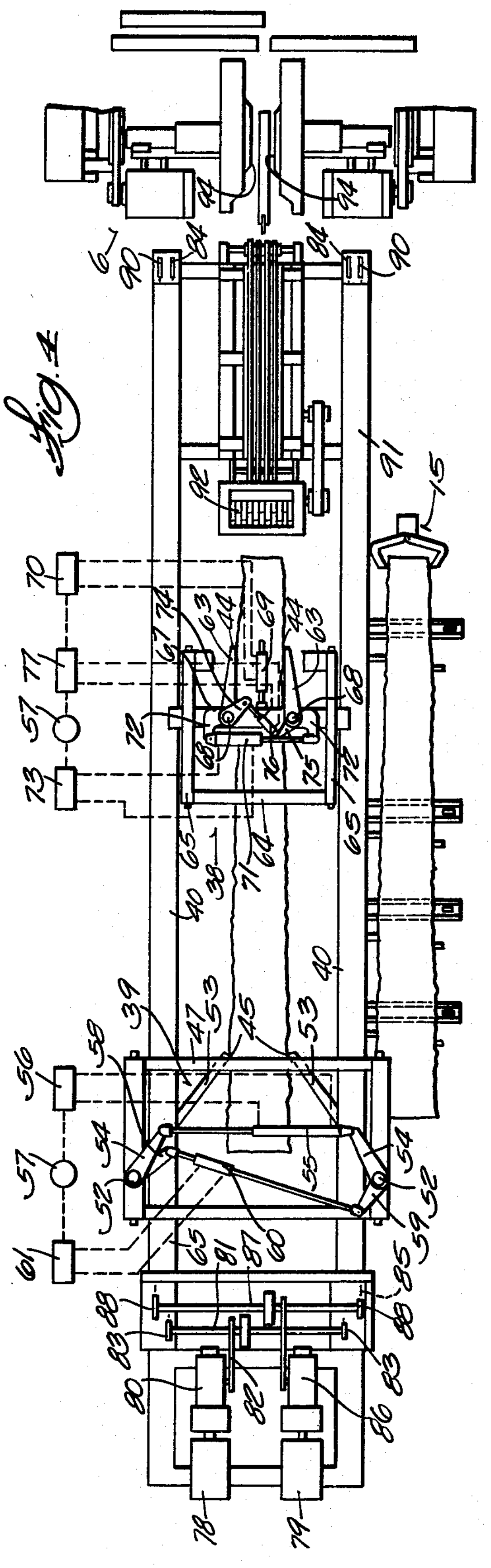
FIG. 4 is a top view of the apparatus shown in FIG. 3 together with a portion of the log orienting apparatus.

The two shafts 68 that are journaled in the rotatable cross-beam 67 are spaced apart by a distance which is not substantially greater than the diameter of the thickest expectable log to be processed, to ensure adequate clearance from the jaw arms of the outer feed carriage. The jaw arms 63 are converged and diverged by means of a double-acting cylinder motor 71, corresponding to the cylinder motor 55 on the outer carriage and connected between lever arms 72 fixed to the upper ends of the shafts 68. To afford an adequate throw for the cylinder motor 71 notwithstanding the relatively small distance between the shafts 68, the lever arms 72 (which correspond in function to the lever arms 54 on the outer carriage) are formed as bent arms, as best seen in FIG. 4. The motor 71 is controlled by means of a valve 73 in circuit with the pump 57.

The inner carriage has a lateral jaw shifting arrangement which is essentially like the one on the outer carriage, comprising forwardly and rearwardly projecting lever arms 74 and 75 secured to the upper ends of the respective shafts 68 and a double-acting cylinder motor 76 connected between the ends of the arms 74 and 75. A valve 77 for controlling the motor 76, connected in circuit with the pump 57, again provides for "float" and "lock" as well as for contraction and extension of that motor.

Although some portions of the mechanism on the inner feed carriage 38 project a small distance above its frame 64, as can be seen in FIG. 3, the frame 47 of the outer feed carriage 39 is supported at a high enough elevation by its legs 48 to clear those parts of the inner carriage structure as the carriages pass one another.

The carriages 38 and 39 are moved along their tracks in feed and return directions by means of reversible electric motors 78 and 79, respectively, that are supported on the rear end portions of the I-beams 40. The motor 78 drives inner feed carriage 38 through a reducing gear box 80 and a rotatable horizontal drive shaft 81 that extends transversely to the feed direction and is rotatably driven from the gear box 80 by means of a chain drive transmission generally designated 82. Secured to the opposite ends of the drive shaft 81 are drive sprockets 83 that overlie the inwardly projecting flanges of the I-beams. A freely rotatable sprocket 84 is mounted over the front end of each of the I-beams, in line with each of the drive sprockets 83 on the drive shaft 81. Over the driving and driven sprockets 83, 84 at each side of the feed mechanism an endless chain 85 is trained to have straight upper and lower stretches which extend in the feed direction. The lower stretch of each chain 85 is secured to the inner carriage 38, and hence, as that chain stretch moves forward or backward, driven by the motor 78, the inner carriage is constrained to move with it in the feed direction or the return direction.

The motor 79 that drives the outer carriage 39 is similarly drivingly connected, through a reducing gear box 86, with a rotatable drive shaft 87 that is parallel to the drive shaft 81. Like the shaft 81, drive shaft 87 has a sprocket 88 secured to each of its ends, but the sprockets 88 overlie the outer flanges 43 of the I-beams. A second freely rotatable sprocket 90 is mounted at the front of the feed mechanism, over each of the I-beams, in line with each of the driving sprockets 88, and an endless chain 91 is trained around each driving sprocket 88 and its aligned front sprocket 90. The lower stretch of each such chain 91 is connected with the outer feed carriage 39.

The sawing machine 6 to which logs are fed by the feed mechanism comprises, as here shown, a planer 92 which produces a flat bottom surface on a log, a feed conveyor 93 upon which that flat bottom surface can rest after the log passes the planer, and cutting elements 94 that produce flat side surfaces on the log. The cutting elements 94 can include one or more saw blades disposed in a vertical plane and arranged to make one or more lengthwise extending cuts through the log.

The feed conveyor 93 comprises parallel belts or chains 96. These belts or chains are trained over a set of coaxial pulleys or sprockets 97 that are spaced from the planar 92 by a small distance in the feed direction, and other set of coaxial pulleys or sprockets 98 that are spaced from the planar by a substantially greater distance in that direction and are located just ahead of the cutting elements 94. One of these sets of pulleys or sprockets is rotatably driven, so that the straight upper stretches of the belts or chains 96, which lie in a common horizontal plane, move in the feed direction at the same speed that a log is carried by the feed carriages 38, 39. A hold-down roller 97, upon which yielding downward force is exerted by means of an air cylinder 98 or the like, bears down upon the log to force its flattened underside into secure driving engagement with the feed conveyor 93. In this way the front end of the log is fed into the bight of a pair of feed rollers 99 which are located just ahead of the cutting elements 94 and which tend to guide and feed the log through the cutting elements.

Assuming that the feed carriages 38 and 39 have the relationship shown in FIG. 3, with the inner carriage 38 supporting the front portion of a log and the outer carriage 39 supporting its rear portion, the jaw elements 42, 43 on the respective carriages will maintain their grips on the log until the front end of the log has entered the bight of the feed rollers 99. At that point the inner feed carriage 38 will have reached the limit of its motion in the feed direction, and its jaw elements 44 are disengaged from the log. The front end portion of the log is then supported, guided and driven in the feed direction by the feed conveyor 93 in cooperation with the feed rollers 99, while the rear end portion of the log continues to be supported by the outer feed carriage 39, which of course continues to move in the feed direction.

As soon as the jaw elements 44 of the inner carriage 38 are disengaged from the log, they are swung up to their inoperative position, and the inner carriage can move in the return direction to a position suitable for supporting the next log, which is by then moving towards the feed mechanism on the transfer mechanism carriage 20. In moving to that position, the inner feed carriage 38 of course passes the outer carriage 39. The outer carriage 39 continues to support the rear end portion of the log and to move in the feeding direction until it reaches the forward limit of its feeding stroke, which is at about the location from which the inner carriage began its return movement. When the outer feed carriage 39 reaches that location, its jaw arms 53 are swung apart to be disengaged from the log, and it can immediately begin a return movement. During feeding of the log just released, the outer carriage 39 was in the trailing position, but for feeding the next log it will be in the leading position; and therefore its return motion is a relatively short one and very quickly accomplished. It will be seen that for each successive log the carriages 38, 39 reverse their leading-trailing relationship.

From the foregoing description taken with the accompanying drawings, it will be apparent that this invention provides a highly efficient apparatus for feeding successive logs through a sawing machine that maintains a steady flow of logs through the cutting machine without substantial delay between successive logs and also enables each log to be individually positioned and oriented for optimum yield in accordance with its particular geometry.

Those skilled in the art will appreciate that the invention can be modified in forms other than as herein disclosed for purposes of illustration.

The invention is deflined by the following claim

I claim:

1. Feed mechanism by which elongated workpieces such as logs can be fed in rapid succession through a cutting zone of a sawing machine or the like with a translatory substantially lengthwise motion in a horizontal feed direction, said feed mechanism comprising:

A. means defining parallel inner and outer tracks extending in said feed direction and located at a level above said cutting zone, each of said tracks comprising a pair of laterally spaced rail members, and both rail members of the inner track being located between the rail members of the outer track;

B. an inner carriage riding on said inner track and guided thereby for motion in said feed direction and in an opposite return direction, all portions of said inner carriage being located substantially between laterally outer limits defined by the rails of the inner track;

C. a pair of jaw arms carried by said inner carriage, each projecting obliquely downwardly and substantially in the feed direction from a normally upright swinging axis, the swinging axes of said jaw arms being spaced apart laterally but located between the rails of the inner track;

D. means on said inner carriage for swinging said jaw arms convergingly and divergingly about their swinging axes;

E. an outer carriage bridging over the inner track and riding on the outer track to be constrained thereby to motion in the feed and return directions, the portion of said outer carriage that is over the inner track being spaced a substantial distance above the same to be clear of all portions of the inner carriage;

F. a second pair of jaw arms carried by said outer carriage, each projecting obliquely downwardly and substantially in the feed direction from a substantially upright swinging axis, the swinging axes of said second jaw arms being laterally outwardly of the outer track at opposite sides thereof; and G. means on said outer carriage for swinging said second pair of jaw arms convergingly and divergingly about their swinging axes.

2. The feed mechanism of claim 1, wherein the swinging axes of the jaw arms on the inner carriage are defined by rotatable shafts, to the lower end portions of which the jaw arms are secured, further characterized by:

H. a transversely extending beam member on said inner carriage by which said shafts are carried and relative to which said shafts are confined to rotation, said beam member being rotatable about an axis that extends along its length to effect upward and downward swinging of the lower ends of said shafts and consequently of the jaw arms; and I. actuation means reacting between said beam member and another part of the inner carriage to rotate said beam member between one defined limit of its rotation at which the jaw arms are in an inoperative position close to the level of the tracks and another defined limit of its motion in which the jaw arms are in an operative position with their free ends near the level of the cutting zone.

3. The feed mechanism of claim 1 wherein the swinging axes of the jaw arms on each of the carriages are defined by rotatable shafts, to the lower end portions of which the jaw arms are secured, further characterized by said means on each of the carriages for swinging its jaw arms convergingly and divergingly about their swinging axes comprising:

(1) means secured to an upper end portion of each of the shafts to provide an eccentric connection to the shaft, the eccentric connections on both of the shafts on the carriage being spaced in the same direction parallel to the feed direction from their axes; and (2) motor means reacting between the eccentric connections on the two shafts to actuate them convergingly and divergingly so that the jaw arms can convergingly grip a workpiece while accommodating themselves to a lateral position in which the workpiece is established.

4. The feed mechanism of claim 3, further characterized by jaw positioning means on each carriage comprising:

(1) further means secured to an upper end portion of each shaft to provide a second eccentric connection to the shaft, (a) said second eccentric connection on one of the shafts on the carriage being spaced in the feed direction from the axis of that shaft, and (b) said second eccentric connection on the other of the shafts on the carriage being spaced in the return direction from the axis of that shaft; and (2) actuator means reacting between said second eccentric connections on the two shafts, said actuator means being arranged to be selectively and alternatively caused (a) to freely permit relative rotation between the shafts so that the jaw arms can freely accommodate themselves to the position of a workpiece as they are converged for gripping it by the motor means;

(b) to prevent relative rotation between the shafts so that the jaw arms, grippingly engaged with a workpiece, are confined against lateral shifting;

(c) to react outwardly between said second eccentric connections and thereby effect lateral shifting in one direction of the jaw arms and the portion of a workpiece gripped between them; and (d) to react inwardly between said second eccentric connections and thereby effect lateral shifting in the opposite direction of the jaw arms and the portion of a workpiece confined between them.

5. Feed mechanism by which elongated workpieces such as logs can be fed in rapid succession through a cutting zone of a sawing machine or the like with a translatory substantially lengthwise motion in a horizontal feed direction, said feed mechanism comprising:

A. means defining parallel inner and outer tracks extending in said feed direction and located at a level which is spaced in one vertical direction from the level of said cutting zone, each of said tracks comprising a pair of laterally spaced rail members and both rail members of the inner track being located between the rail members of the outer track;

B. an inner carriage riding on said inner track and contrained thereby to motion in said feed direction and in an opposite return direction, all portions of said inner carriage being located substantially between laterally outer limits defined by the rails of the inner track;

C. a pair of jaw members having workpiece gripping portions which are spaced in the opposite vertical direction from the inner carriage, said jaw members having connections with the inner carriage that are between the rail members of the inner track and whereby said gripping portions are constrained to move with the inner carriage in said feed and return directions but are movable laterally relative to the inner carriage and to one another;

D. means on said inner carriage for moving said jaw members to converge and diverge their gripping portions;

E. an outer carriage extending across the inner track and riding on the outer track to be constrained thereby to motion in said feed and return directions, the portion of said carriage that extends across the inner track being spaced in said one vertical direction from said inner track to be clear of all portions of the inner carriage when the carriages pass one another;

F. a second pair of jaw members carried by said outer carriage, having other workpiece gripping portions which are at substantially the level of the cutting zone, said jaw members of the second pair having connections with the outer carriage that are spaced laterally outwardly from the inner track and are at opposite sides thereof whereby said other gripping portions are constrained to move with the outer carriage in said feed and return directions but are movable laterally relative to the outer carriage and to one another; and G. means on said outer carriage for moving the jaw members of said second pair to converge and diverge said other gripping portions.

6. The feed mechanism of claim 5, further characterized by:

H. said connections between the first mentioned jaw members and the inner carriage comprising rotatable shafts;

I. a transversely extending beam member on said inner carriage by which said shafts are carried and relative to which said shafts are confined to rotation, said beam member being rotatable about an axis that extends along its length and said shafts extending substantially transversely to said beam member and parallel to one another so that rotation of said beam member between defined limits effects vertical displacement of the first mentioned workpiece gripping portions between an operative position at a level near that of the cutting zone and an inoperative position at a level near that of the tracks; and J. actuator means reacting between said beam member and another part of the inner carriage to rotate said beam member between said defined limits.

* * * * *